United States Patent [19]

Shallenberger, Jr.

[11] 4,412,763
[45] Nov. 1, 1983

[54] DRILL WITH SINGLE CUTTER

[75] Inventor: Fred T. Shallenberger, Jr., Caledonia, Ill.

[73] Assignee: Metal Cutting Tools, Inc., Rockford, Ill.

[21] Appl. No.: 266,734

[22] Filed: Jan. 21, 1981

[51] Int. Cl.³ .............................................. B23B 27/16
[52] U.S. Cl. ................................. 408/224; 408/228; 408/229; 408/233; 408/713; 407/42
[58] Field of Search ............... 408/228, 211, 229, 233, 408/223, 224, 713; 407/54, 40, 42, 36, 120

[56] References Cited

U.S. PATENT DOCUMENTS

| 864,756 | 8/1907 | Phillips | 408/211 |
|---|---|---|---|
| 3,514,828 | 6/1970 | Wale | 407/54 |
| 3,630,204 | 12/1971 | Fishbein | 408/228 |
| 3,863,316 | 2/1975 | Yeo | 407/54 |
| 3,963,365 | 6/1976 | Shallenberger, Jr. | 408/186 |
| 3,963,366 | 6/1976 | Eckle et al. | 408/713 |
| 4,034,452 | 7/1977 | Edming | 407/54 |
| 4,176,990 | 12/1979 | Gover, Sr. | 408/223 |
| 4,230,429 | 10/1980 | Eckle | 408/186 |

FOREIGN PATENT DOCUMENTS

| 2048835 | 4/1972 | Fed. Rep. of Germany | 407/54 |
|---|---|---|---|
| 2653302 | 10/1978 | Fed. Rep. of Germany | 407/36 |
| 832238 | 10/1956 | United Kingdom . | |
| 842133 | 12/1957 | United Kingdom . | |
| 961449 | 3/1962 | United Kingdom . | |
| 1062158 | 12/1962 | United Kingdom . | |
| 1008029 | 9/1963 | United Kingdom . | |
| 1504066 | 5/1976 | United Kingdom . | |
| 1552377 | 7/1976 | United Kingdom . | |
| 1325052 | 8/1970 | United Kingdom . | |

Primary Examiner—Leonidas Vlachos
Attorney, Agent, or Firm—Leydig, Voit, Osann, Mayer & Holt, Ltd.

[57] ABSTRACT

To form holes of small diameter, a drill includes a single cutting insert having an active edge portion with two oppositely facing cutting edges. When the drill is rotated, one cutting edge of the insert cuts the center portion of the hole while the oppositely facing cutting edge cuts the peripheral portion of the hole.

7 Claims, 9 Drawing Figures

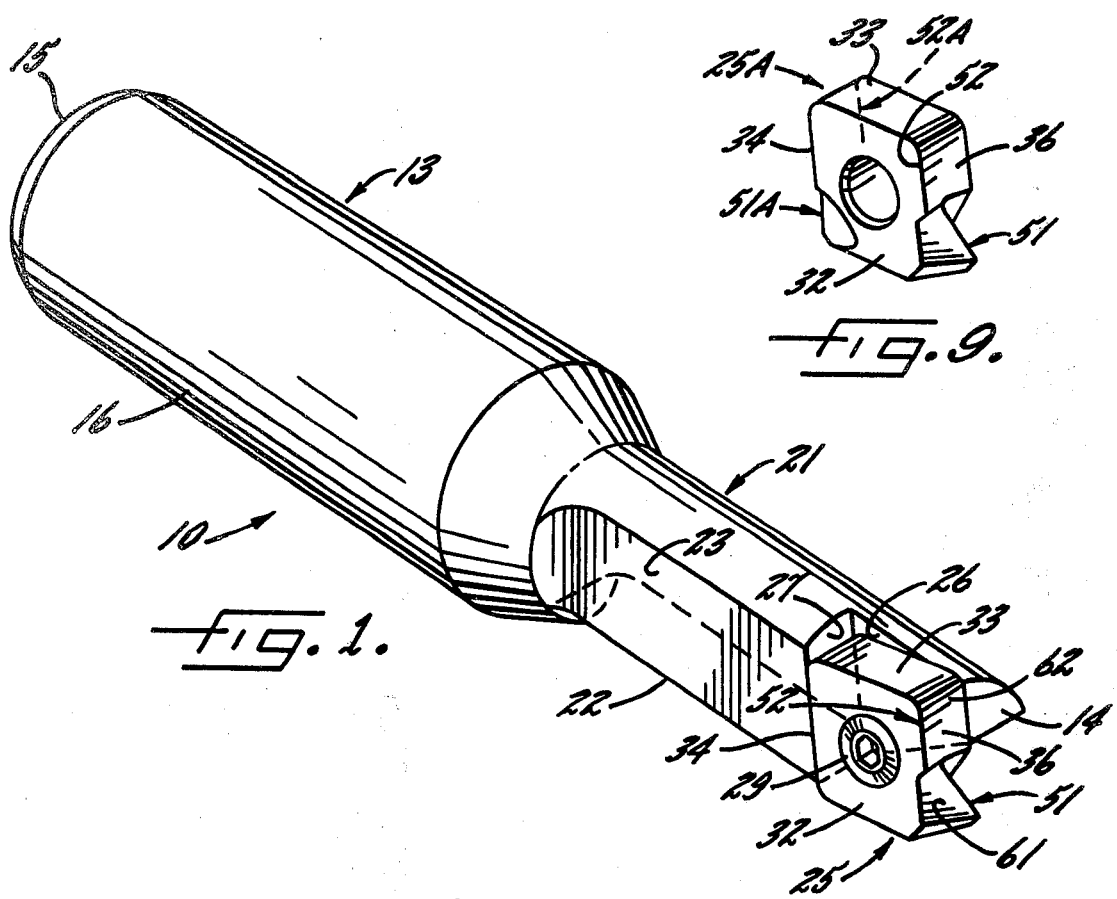
Fig. 9.
Fig. 1.
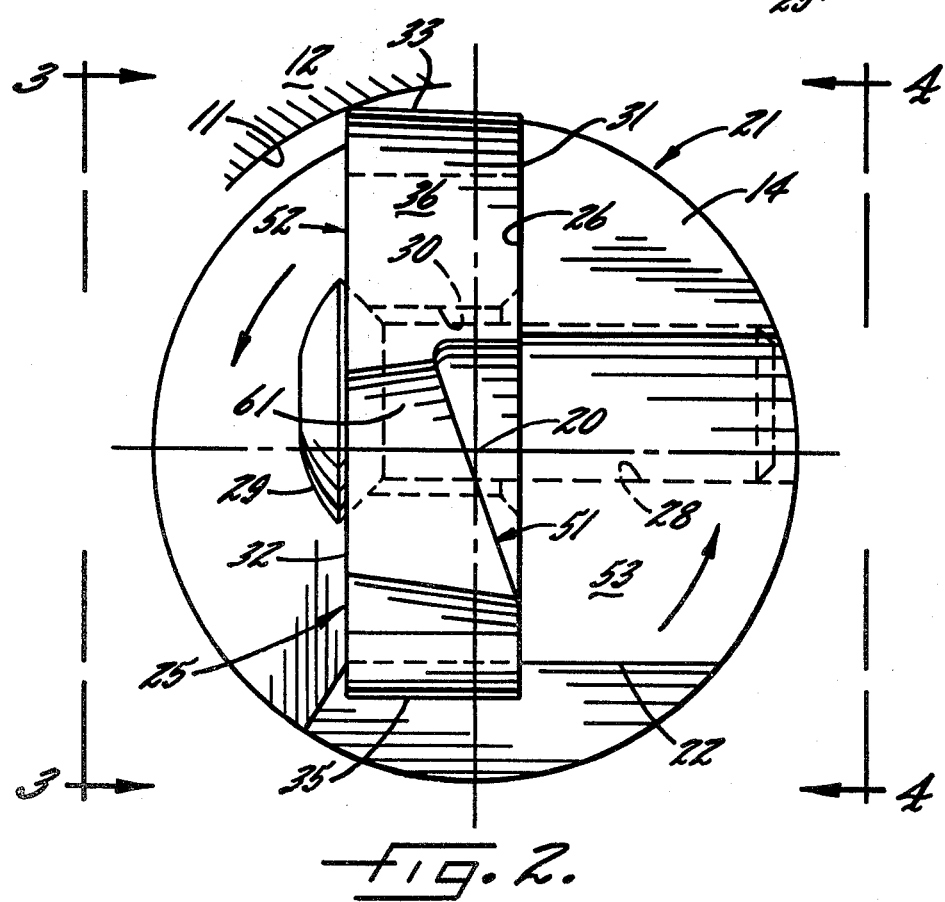
Fig. 2.

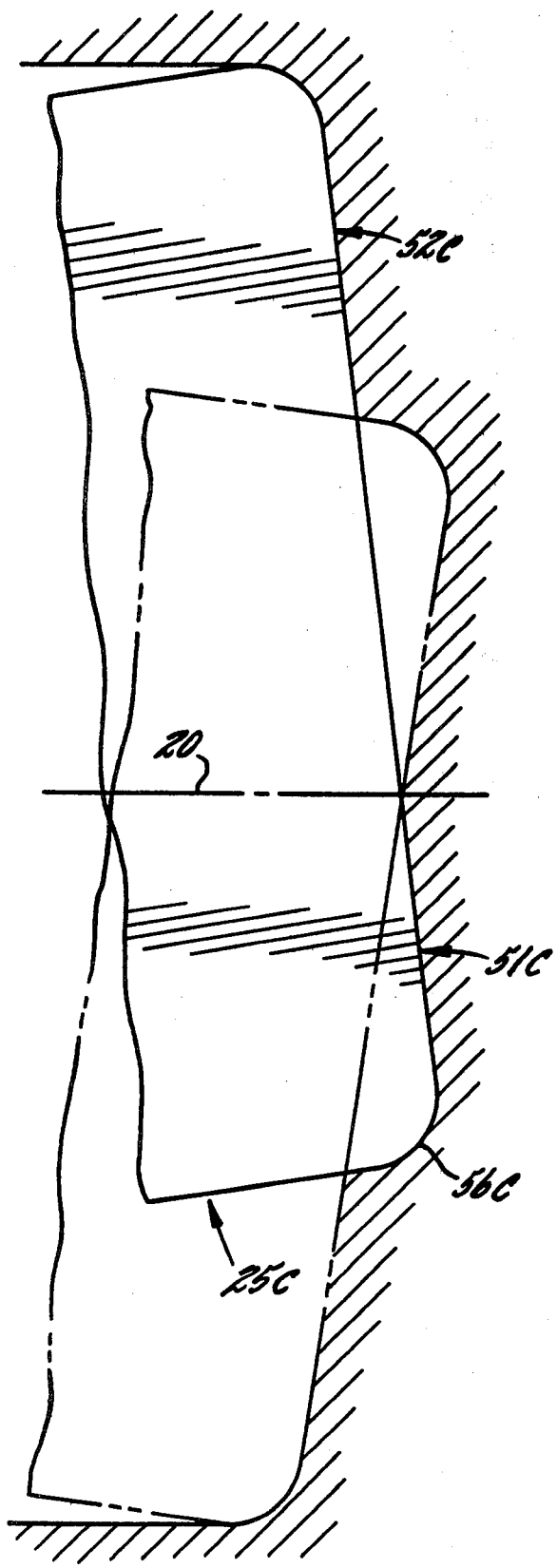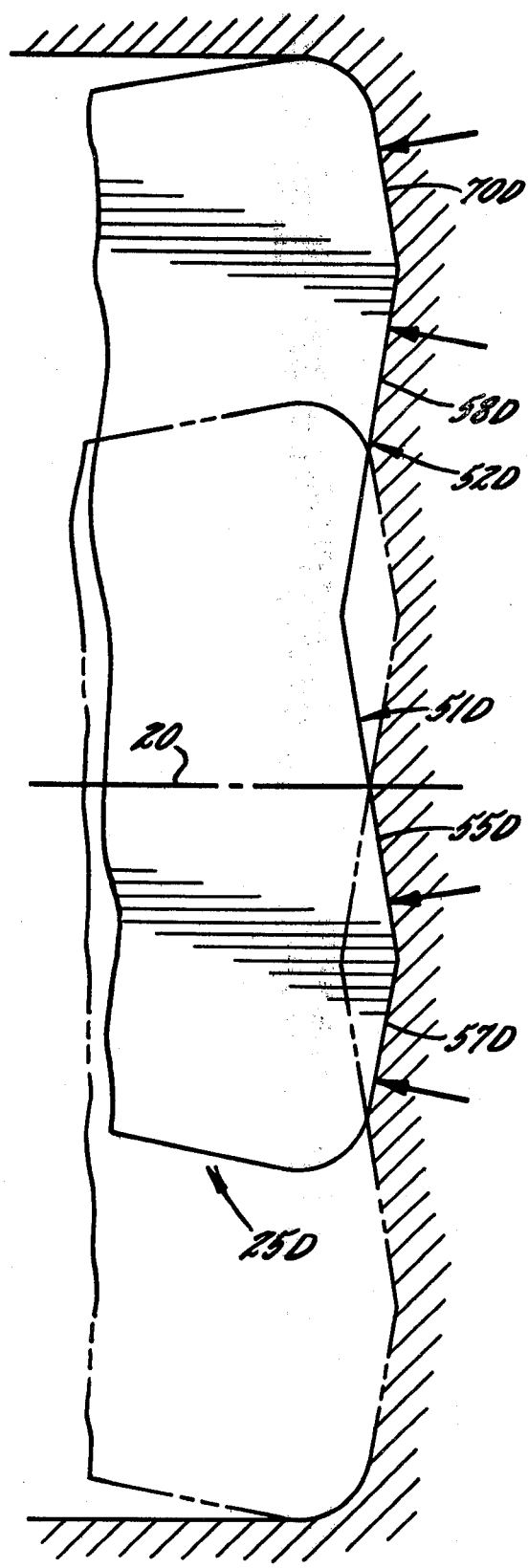

DRILL WITH SINGLE CUTTER

BACKGROUND OF THE INVENTION

This invention relates to a drill for drilling a substantially cylindrical hole in a workpiece. More particularly, the invention relates to a drill of the same general type as the drill disclosed in Shallenberger, Jr. U.S. Pat. No. 3,963,365. In that drill, two cutters in the form of indexable cutting inserts are supported by a drill body which is adapted to be rotated about an axis coinciding with the axis of the hole. When the drill body is rotated, one of the inserts cuts the central portion of the hole while the other insert cuts the peripheral portion of the hole. Each insert may be periodically indexed and/or inverted to bring a fresh cutting edge into active cutting position and, when all of the available edges have been worn, the insert may be removed from the drill body and replaced with a new insert.

The drill disclosed in the Shallenberger, Jr. patent performs admirably when drilling holes of relatively large diameter. The drill does not, however, readily lend itself to drilling holes of comparatively small diameter because of the physical impracticality of fitting two inserts of cutters into a relatively small hole. While drills with a single cutter do exist, the cutter of such a drill does, to the best of my knowledge, form the hole by making a single cut which is equal in radial length to the radius of the hole. In other words, the cutter cuts away a chip and forms the hole by sweeping through a path which extends radially from the center of the hole to the wall thereof.

SUMMARY OF THE INVENTION

The general aim of the present invention is to provide a new and improved small diameter drill having a single cutter which is uniquely constructed to make two cuts in the hole in order to break up the chip so as to facilitate formation of the hole and to promote better chip flow out of the hole.

A more detailed object is to achieve the foregoing by providing a single-piece cutter having a transversely extending cutting edge portion formed with novel inner and outer cutting edges which face in opposite directions from one another but which both face in the direction of rotation of the drill. When the drill is rotated, the inner cutting edge cuts the central portion of the hole while the oppositely facing outer cutting edge cuts the remaining portion of the hole at a location which is spaced substantially diametrically from the cut made by the inner edge. In this way, the single cutter is capable of forming a small diameter hole and yet, at the same time, the cut is broken up to form two chips which escape out of the hole along different paths.

A further object of the invention is to provide a cutter of the foregoing type which may be easily removed and replaced and which preferably is in the form of an indexable insert having multiple cutting edges adapted to be selectively brought into active cutting position.

The invention also resides in a cutter or insert having uniquely arranged cutting edges, cutting faces and clearance faces which coact with one another to enable a single transversely extending edge portion to make two separate radially extending cuts at two substantially diametrically spaced locations.

These and other objects and advantages of the invention will become more apparent from the following detailed description when taken in conjunction with the accompanying drawings.

BRIEF DESCRIPTION OF THE DRAWINGS

FIG. 1 is a perspective view of a new and improved drill incorporating the unique features of the present invention.

FIG. 2 is an enlarged end elevational view of the tip of the drill shown in FIG. 1.

FIGS. 6, 7 and 8 are views similar to FIG. 5 but show three additional embodiments of a cutter incorporating the novel features of the invention.

FIG. 9 is a perspective view which shows the cutter of FIGS. 1 to 5 in the form of a multiple edge indexable insert.

DETAILED DESCRIPTION OF THE PREFERRED EMBODIMENTS

Figure 3:
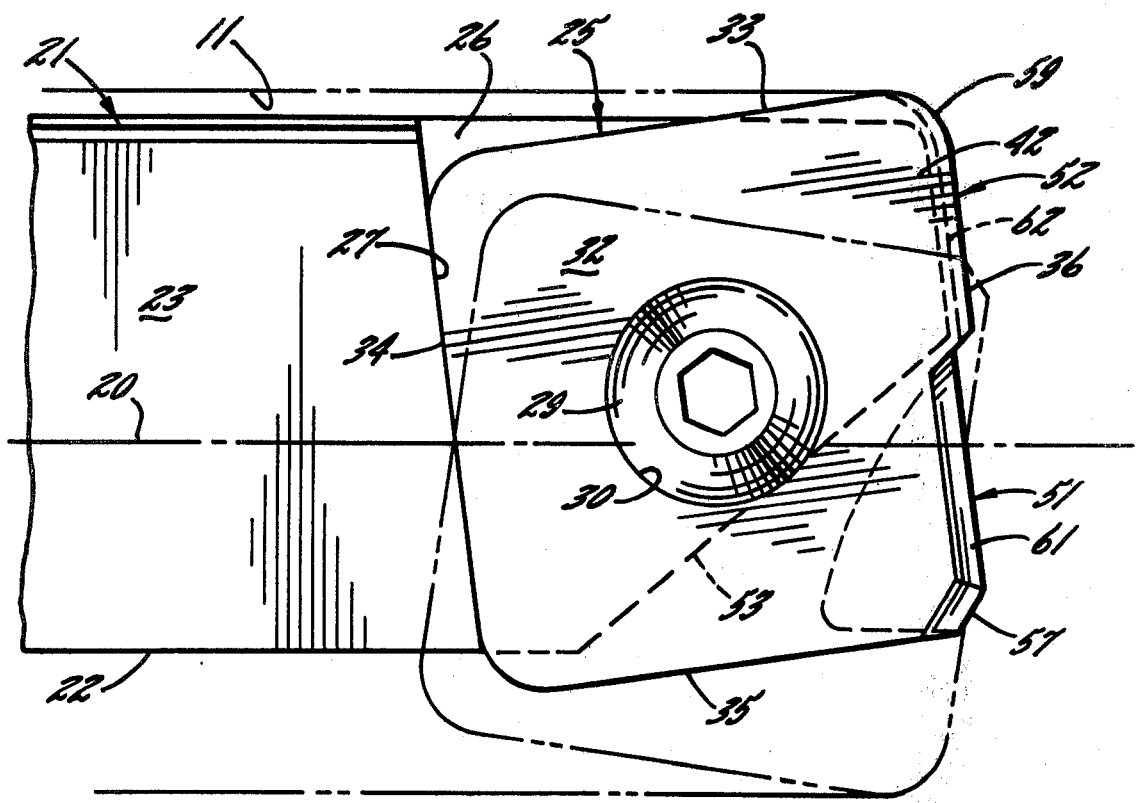
FIGS. 3 and 4 are fragmentary side elevational views of the drill as taken along the lines 3—3 and 4—4, respectively, of FIG. 2 and show, in dash-dot lines, the position of the cutter when the latter is rotated approximately 180 degrees about the axis of the hole.

As shown in the drawings for purposes of illustration, the invention is embodied in a drill 10 for forming a substantially cylindrical hole 11 (FIGS. 2 and 5) in a workpiece 12. The drill comprises an elongated body 13 (FIG. 1) made of high carbon steel and having a tip end 14 and an opposite shank end 15. The shank end portion of the body is defined by an enlarged diameter cylindrical shank 16 adapted to be clamped in a power-rotated holder (not shown) for rotating the shank about its own axis, which coincides with the axis 20 of the hole. Herein, the rotation is in a counterclockwise direction as viewed in FIG. 2.

Formed integrally with and extending forwardly from the shank 16 and forming part of the body 13 is a bar 21 whose maximum transverse dimension is substantially smaller than the diameter of the hole 11. Two right-angled sides 22 and 23 of the bar are flat and planar while the remaining side surface of the bar is cylindrically curved about the axis 20. Each flat side is disposed in a chordal plane which is offset radially outwardly from and extends parallel to the axis 20. When the bar 21 is rotated counterclockwise, the flat surface 22 leads the flat surface 23 in the direction of rotation and both lead the cylindrical surface.

A pocket for receiving a cutter 25 is formed in the tip end portion of the bar 21 and herein is formed by a flat platform 26 (FIG. 1) and by a flat shoulder 27 located at the inner end of the platform. The platform 26 extends parallel to the flat surface 23 but is offset in the opposite direction from the axis 20 and thus the flat surface 23 and the platform 26 lie on opposite sides of the axis. The shoulder 27 is disposed at right angles to the surface of the platform 26 and is inclined relative to the axis 20 as shown in FIG. 3. A tapped hole 28 (FIGS. 2 and 4) preferably is formed in the platform and is adapted to receive a locking screw 29 for releasably clamping the cutter 25 against the platform 26 and the shoulder 27.

In accordance with the present invention, the cutter 25 is of single-piece construction and is formed with a unique cutting edge portion which cuts the central portion of the hole 11 and which, at the same time, cuts the outer portion of the hole at a location spaced approximately diametrically from the location of the center cut. In this way, a relatively small single cutter is capable of drilling a relatively small diameter hole and yet is capable of breaking up the metal into two separate chip flows which may escape from the hole at two different locations. As a result, the speed and efficiency of the drilling operation are increased when compared with a drill having a single cutter whose cutting edge sweeps through a path corresponding to the radius of the hole.

Figure 4:
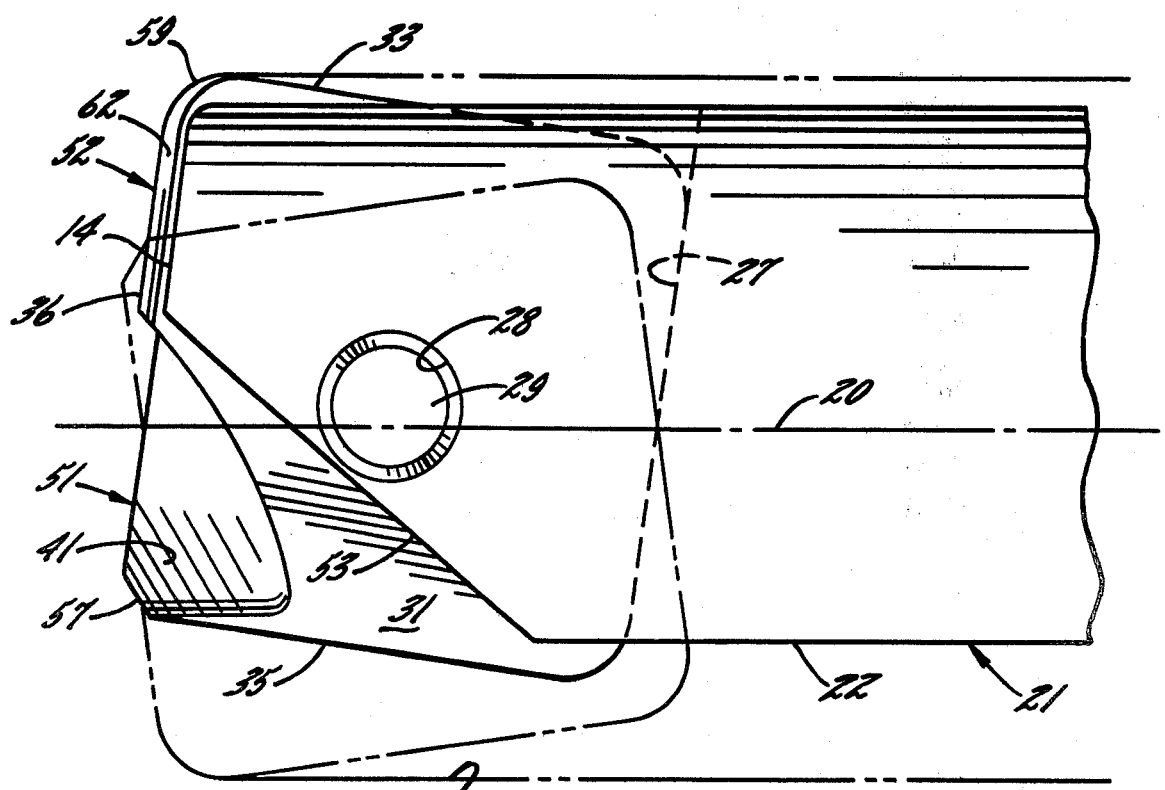

The preferred cutter 25 is in the form of a substantially flat wafer made of tungsten carbide or other suitable cutting material and shaped as a substantially equilateral polygon. In this particular instance, the wafer 25 is generally square in shape and is formed with a centrally located and conically countersunk hole 30 (FIGS. 2 and 3) for receiving the locking screw 29. The hole 30 extends between two oppositely facing face surfaces 31 and 32 (FIGS. 3 and 4). Extending between the face surfaces are four edge surfaces 33, 34, 35 and 36. In the wafer 25 shown in FIGS. 1 to 5, the edge surfaces 33, 34 and 35 are flat and planar and are disposed at right angles to the face surfaces 31 and 32. When the wafer 25 is in cutting position on the bar 21, the face surface 31 is clamped in face-to-face contact with the platform 26 while the rear edge surface 34 is face-to-face with the shoulder 27. Because of the inclination of the shoulder 27, the side edge surface 33 diverges away from the wall of the hole 11 as the side edge surface 33 progresses toward the shank 16 and thus the side edge surface clears the wall of the hole when the drill 10 is rotated.

Figure 5:
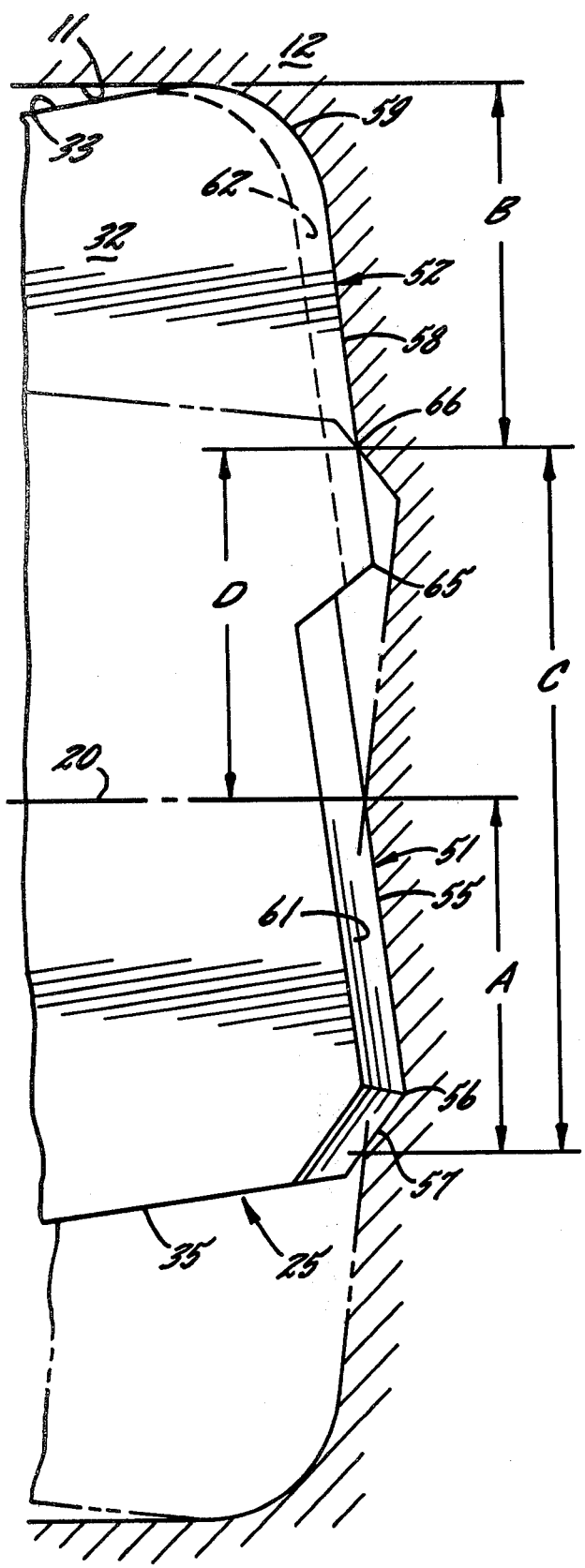
FIG. 5 is a diagrammatic view which, in solid lines, shows the cutter positioned in a hole and which, in dash-dot lines, shows the cutter when the latter is rotated approximately 180 degrees about the axis of the hole.

In carrying out the invention, the outer tip portion of the cutting wafer 25 is formed with two cutting faces 41 (FIG. 4) and 42 (FIG. 3) which face oppositely of one another but which both face in the direction of rotation of the drill 10. The cutting face 41 is defined by relieving the tip end portion of the face surface 31 adjacent one corner thereof while the cutting face 42 is defined by the flat tip end portion of the other face surface 32 adjacent the transversely opposite corner. A cutting edge 51 extends along and adjoins the cutting face 41 and is defined along the intersection of the cutting face 41 with a clearance face 61 (FIG. 5). The clearance face 61 is formed by a portion of the edge surface 36 and is disposed in a plane which is inclined relative to the axis 20 of the hole 11 in a direction to provide the necessary axial clearance between the cutting edge 51 and the bottom of the hole. When the wafer 25 is viewed in the position shown in FIG. 3, the clearance face 61 is disposed in a plane which slopes upwardly and rearwardly. The tip end portion of the bar 21 is cut away beneath the cutting face 41 along an angled surface indicated at 53 in FIG. 4 so as to expose the cutting face 41 and the cutting edge 51.

A second cutting edge 52 extends along and adjoins the cutting face 42 and is defined along the intersection of the cutting face 42 with a second clearance face 62 (FIGS. 4 and 5). The clearance face 62 is formed by the remaining portion of the edge surface 36 and is inclined oppositely of the clearance face 61 in order to provide axial clearance between the cutting edge 52 and the bottom of the hole 11. In other words, the clearance face 62 is disposed in a plane which slopes downwardly and rearwardly when the wafer 25 is viewed as shown in FIG. 3.

As shown in FIG. 5, the cutting edge 51 crosses the axis 20 of the hole 11 and extends outwardly from one side of the axis toward the wall of the hole. The edge 51 is disposed at a positive radial rake angle and includes a straight portion 55 which is inclined so as to progress away from the rear or shank end 15 of the body 13 as it progresses outwardly from the axis 20. At the outer end 56 of the straight portion 55, the cutting edge 51 includes a short reversely inclined portion 57 which progresses toward the shank end 15 of the body as it progresses outwardly from the axis. In keeping with the invention, the cutting edge 51 extends outwardly from one side of the axis 20 through a predetermined effective distance A (FIG. 5) which is less than the radius of the hole 11 and which preferably but not necessarily is equal to one-half the radius. The cutting edge 52 extends inwardly from the periphery of the hole toward the other side of the axis through an effective distance B which is equal to the difference between the distance A and the radius of the hole 11. The cutting edge 52 preferably is disposed at a negative radial rake angle and includes a straight portion 58 which progresses away from the shank end 15 of the body 13 as it progresses inwardly from the periphery of the hole, the extreme outer end portion of the cutting edge 52 being radiused as indicated at 59.

In FIG. 5, the wafer 25 is shown in solid lines in the position which it occupies when the drill 10 is in any given angular position. In dash-dot lines, the wafer is shown in the position it occupies when the drill is rotated 180 degrees from the solid line position. As is apparent, the cutting edge 51 cuts the center portion of the hole 11 outwardly from the axis 20 and, as the drill is rotated, forms a center cut of diameter C. At the same time, the cutting edge 52 makes an annular cut having a radial width B at the peripheral portion of the hole 11 but that cut, at any given instant, is spaced approximately 180 degrees from the cut being made by the cutting edge 51. As a result, two separate chips are formed at two separate locations with each chip having a radial width less than the radius of the hole 11. Accordingly, the overall chip is broken up and, at the same time, the chips flow out of the hole along two separate paths to promote efficient cutting by reducing the chip interference. The flow of chips formed by the cutting edge 52 escapes out of the hole along the flat surface 23 of the bar 21 while the flow of chips formed by the cutting edge 51 escapes out of the hole along the angled surface 53 and the flat surface 22 of the bar.

As shown in FIG. 5, the outermost point 56 of the straight portion 55 of the cutting edge 51 is set out axially ahead of the extreme innermost point 65 of the straight portion 58 of the edge 52. Accordingly, the cutting edge 51 establishes clearance for that non-cutting length D (FIG. 5) of the edge extending between the axis 20 and the innermost point 66 of the effective part of the straight portion 58 of the cutting edge 52. In other words, the cutting edge 51 in effect "runs interference" for the non-cutting length D by cutting away metal which otherwise would be encountered by the non-cutting length and which would cause the non-cutting length to fracture and break up.

With the cutter 25 being in the form of a screw-held wafer, it is a relatively simple matter to remove and replace the cutter when the cutting edges 51 and 52 become worn. Preferably, the wafer is formed as an indexable cutting insert with multiple sets of cutting edges as indicated at 25A in FIG. 9. The edge surface 36 of the insert 25A includes cutting edges 51 and 52 which are identical to those of the wafer 25. In addition, the edge surface 34 of the insert 25A is formed with an identical set of cutting edges 51A and 52A with the cutting edge 51A adjoining the face surface 32 and with the cutting edge 52A adjoining the face surface 31. By inverting the insert 25A and turning the insert edgewise through 180 degrees, the cutting edges 51A and 52A may be brought into active cutting position after the edges 51 and 52 have become worn. When the insert 25A of FIG. 9 is used, the shoulder 27 of the pocket in the body 13 may be suitably modified to enable the inactive edge surface 34 or 36 to seat securely against the shoulder.

Figure 6:
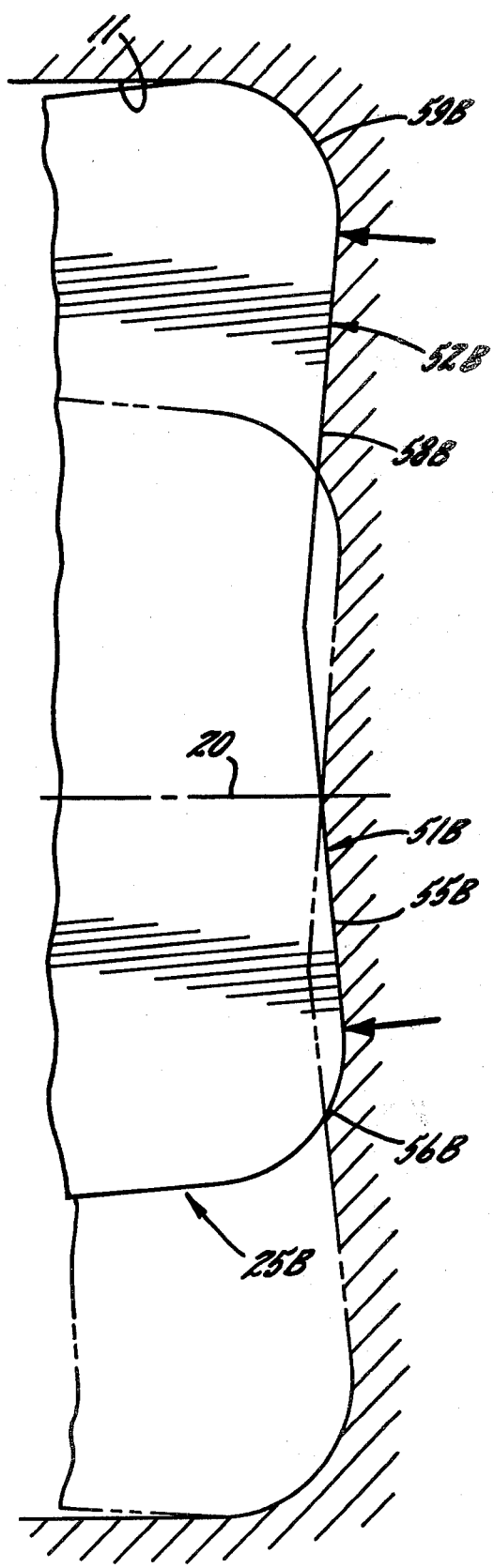

A modified cutter 25B is shown in FIG. 6. In the cutter 25B, the cutting edge 51B extends outwardly from the axis 20 in the same direction as the cutting edge 51 but terminates in a radiused corner 56B. The cutting edge 52B is shaped the same as the cutting edge 52 but its straight portion 58B progresses toward the shank end 15 of the body 16 as it progresses inwardly from the periphery of the hole 11. The cutting forces imposed on the cutting edges 51B and 52B are exerted generally in the direction of the arrows in FIG. 6 and tend to oppose one another to improve the radial balance and reduce radial deflection of the drill.

Another modified cutter 25C is shown in FIG. 7. In this instance, the cutting edges 51C and 52C are inclined the same as the cutting edges 51 and 52 but lie along a single line. The cutting edge 51C terminates in a radiused corner 56C.

Still another modified cutter 25D is shown in FIG. 8. In the cutter 25D, the cutting edge 51D includes an inclined straight portion 55D and a reversely inclined straight portion 57D. The cutting edge 52D also includes an inclined straight portion 58D and a reversely inclined straight portion 70D. The cutting forces imposed on the cutting edges are exerted generally in the direction of the arrows shown in FIG. 8 and thus the cutter possesses good radial balance.

I claim:

1. A drill for drilling a substantially cylindrical hole of predetermined diameter in a workpiece, said drill having an elongated body adapted to be rotated in a predetermined direction about a predetermined axis coinciding with the axis of the hole, said body having a shank end and a tip end, a single drilling cutter on the tip end portion of said body, said cutter being defined by a single and substantially flat wafer of cutting material in the shape of a substantially equilateral polygon, means for releasably securing said cutter to the tip end portion of said body, said cutter having first and second cutting faces which face oppositely of one another but which both face in the direction of rotation, the tip end of said cutter having a first cutting edge adjoining said first cutting face and extending outwardly from one side of said axis toward the periphery of said cutter through a total predetermined effective radial cutting distance less than the radius of said hole whereby said first cutting edge cuts only the center portion of said hole when said body is rotated, and the tip end of said cutter having a second cutting edge adjoining said second cutting face and extending inwardly from the outer periphery of the cutter toward the other side of said axis through a total effective radial cutting distance equal to the difference between the radius of said hole and said first-mentioned predetermined effective radial cutting distance whereby said second cutting edge cuts only the peripheral portion of said hole when said body is rotated, the combined total effective radial cutting distances of said first and second cutting edges being no greater than the radius of said hole, said first and second cutting edges being formed along one side of said polygon, and a second pair of first and second cutting edges formed along another side of said polygon and identical to the first and second cutting edges of the first pair.

2. A drill as defined in claim 1 in which the tip end of said cutter includes an edge surface extending between said cutting faces, first and second substantially planar clearance faces on said edge surface, said first cutting edge of said first pair of cutting edges being defined at the intersection of said first clearance face and said first cutting face, said second cutting edge of said first pair of cutting edges being defined at the intersection of said second clearance face and said second cutting face, said first clearance face being disposed in a plane which is inclined in one direction relative to said axis, and said second clearance face being disposed in a plane which is inclined in the opposite direction relative to said axis.

3. A drill as defined in either of claims 1 or 2 in which the tip end of said cutter includes a non-cutting surface located between said first and second cutting edges of said first pair of cutting edges.

4. A drill as defined in either of claims 1 or 2 in which said first cutting edge of said first pair of cutting edges is inclined relative to said axis so as to progress away from the shank end of said body as such cutting edge extends outwardly from said axis toward the periphery of said cutter.

5. A drill as defined in claim 4 in which said second cutting edge of said first pair of cutting edges is inclined relative to said axis so as to progress away from the shank end of said body as such cutting edge extends inwardly from the periphery of said cutter toward the other side of said axis.

6. A drill as defined in claim 4 in which said second cutting edge of said first pair of cutting edges is inclined relative to said axis so as to progress toward the shank end of said body as such cutting edge extends inwardly from the periphery of said cutter toward the other side of said axis.

7. A drill as defined in claim 1 in which the cutting edges of the first pair and the cutting edges of the second pair are located on opposite sides of the polygon, the first cutting edge of the first pair adjoining one face of the polygon, the second cutting edge of the first pair adjoining the opposite face of the polygon, the first cutting edge of the second pair adjoining said opposite face of the polygon, and the second cutting edge of the second pair adjoining said one face of the polygon.

* * * * *